US011967981B2

(12) United States Patent
Raghavan

(10) Patent No.: US 11,967,981 B2
(45) Date of Patent: Apr. 23, 2024

(54) DIVERSITY RECEIVER PRODUCT ARCHITECTURES FOR HIGH BAND, ULTRA-HIGH BAND AND E-UTRAN NEW RADIO

(71) Applicant: SKYWORKS SOLUTIONS, INC., Irvine, CA (US)

(72) Inventor: Anand Raghavan, Middleton, WI (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 100 days.

(21) Appl. No.: 17/953,454

(22) Filed: Sep. 27, 2022

(65) Prior Publication Data

US 2023/0107261 A1    Apr. 6, 2023

Related U.S. Application Data

(60) Provisional application No. 63/251,177, filed on Oct. 1, 2021.

(51) Int. Cl.
*H04B 1/10* (2006.01)
*H04B 1/18* (2006.01)

(52) U.S. Cl.
CPC .............. *H04B 1/10* (2013.01); *H04B 1/18* (2013.01)

(58) Field of Classification Search
CPC ..................................... H04B 1/10; H04B 1/18
USPC .......................................... 375/299, 346–349
See application file for complete search history.

(56) References Cited

U.S. PATENT DOCUMENTS

| | | | |
|---|---|---|---|
| 2011/0175789 A1* | 7/2011 | Lee ..................... | H01Q 1/243 333/17.1 |
| 2014/0024322 A1* | 1/2014 | Khlat ................... | H04B 7/0602 455/78 |
| 2014/0092795 A1* | 4/2014 | Granger-Jones ...... | H04L 5/08 370/297 |
| 2014/0334362 A1* | 11/2014 | Granger-Jones ...... | H03J 3/20 334/78 |
| 2015/0105120 A1* | 4/2015 | Lim ..................... | H04B 1/0064 455/552.1 |
| 2015/0109977 A1* | 4/2015 | Loh ...................... | H04L 5/0023 370/330 |
| 2015/0373711 A1* | 12/2015 | Narathong ........... | H04B 1/0057 370/280 |
| 2017/0155421 A1 | 6/2017 | Wloczysiak | |
| 2017/0359113 A1* | 12/2017 | Lee ..................... | H04B 7/0691 |
| 2018/0309528 A1* | 10/2018 | King .................... | H04J 1/045 |
| 2018/0331714 A1* | 11/2018 | See ...................... | H04B 7/0814 |
| 2019/0253096 A1* | 8/2019 | Sato ..................... | H04B 1/40 |
| 2021/0006274 A1* | 1/2021 | Kani ..................... | H03H 7/46 |

(Continued)

*Primary Examiner* — Emmanuel Bayard
(74) *Attorney, Agent, or Firm* — Lando & Anastasi, LLP

(57) ABSTRACT

A diversity receiver module comprising a multiple pole multiple throw switch, one throw being connected to a signal path configured to support both ultra-high band transmit signals and high-band transmit signals, and another throw being connected to an ultra-high band signal path configured to output an ultra-high band receive signal; an ultra-high band filter configured to filter ultra-high band signals, the ultra-high band filter being connected to a pole of the switch via a signal path; a high band filter configured to filter high band receive signals, the high band filter being diplexed with the ultra-high band filter; and a high band signal path configured to output a high-band receive signal, the high band signal path being connected to the high band filter.

20 Claims, 7 Drawing Sheets

(56) References Cited

U.S. PATENT DOCUMENTS

| | | | | |
|---|---|---|---|---|
| 2021/0218158 A1* | 7/2021 | Kim | ......................... | H01Q 1/38 |
| 2021/0218424 A1* | 7/2021 | Pehlke | ................. | H04B 1/0057 |
| 2021/0336642 A1* | 10/2021 | Matsumoto | .............. | H04B 1/44 |
| 2022/0399877 A1* | 12/2022 | Burra | ..................... | H03H 9/605 |
| 2023/0077767 A1* | 3/2023 | Beaudin | ............... | H04B 7/0413 |
| | | | | 455/552.1 |

* cited by examiner

DIVERSITY RECEIVER PRODUCT ARCHITECTURES FOR HIGH BAND, ULTRA-HIGH BAND AND E-UTRAN NEW RADIO

CROSS-REFERENCE TO RELATED APPLICATIONS

This application claims priority under 35 U.S.C. § 119(e) to U.S. Provisional Application Ser. No. 63/251,177 titled "DIVERSITY RECEIVER PRODUCT ARCHITECTURES FOR HIGH BAND, ULTRA-HIGH BAND AND E-UTRAN NEW RADIO," filed on Oct. 1, 2021, which is hereby incorporated by reference in its entirety.

BACKGROUND

Field

The present disclosure generally relates to diversity receiver (DRx) product architectures for wireless communication systems.

Description of the Related Technology

A radio-frequency (RF) system can include antennas for receiving and/or transmitting RF signals. However, there can be several components in an RF system that may need access to the antennas. For example, an RF system can include different transmit or receive paths associated with different frequency bands, different communication standards, and/or different power modes, and each path may need access to a particular antenna at certain times.

An antenna switch module can be used to electrically connect a particular antenna to a particular transmit or receive path of the RF system, thereby allowing multiple components to share antennas. In certain configurations, an antenna switch module is in communication with a diversity module, which processes signals that are received and/or transmitted using one or more diversity antennas. A DRx module can be configured to perform processing on the diversity signal received from the diversity antenna.

SUMMARY

According to one example there is provided, a diversity receiver module, the diversity receiver module comprising: a multiple pole multiple throw switch, one throw being connected to a signal path configured to support both ultra-high band transmit signals and high-band transmit signals, and another throw being connected to an ultra-high band signal path configured to output an ultra-high band receive signal; an ultra-high band filter configured to filter ultra-high band signals, the ultra-high band filter being connected to a pole of the switch via a signal path; a high band filter configured to filter high band receive signals, the high band filter being diplexed with the ultra-high band filter; and a high band signal path configured to output a high-band receive signal, the high band signal path being connected to the high band filter.

In one example the ultra-high band filter may be a high-pass filter.

In one example the diversity receiver module may further comprise a second ultra-high band filter.

In one example the diversity receiver module may further comprise a second high-band filter.

In one example the second high-band filter may be diplexed with the second ultra-high band filter.

In one example the second ultra-high band filter may be connected to a second pole of the switch.

In one example the high-band filter may be a B41 filter.

In one example the high-band filter may be a B40 filter.

In one example the second high-band filter may be a B41 filter.

In one example the second high-band filter may be configured to filter high-band receive signals.

In one example the second high-band filter may be a B40 filter.

In one example the high band signal path may include an inline switch.

In one example the diversity receiver module may further comprise a second high band signal path connected to the second high band filter.

In one example the multiple pole multiple throw switch may be a dual pole five throw switch.

In one example the ultra-high band signal path may be a fifth generation New Radio ultra-high band signal path.

In one example the ultra-high band signal path may be an n77 signal path.

In one example the diversity receiver module may further comprise a second ultra-high band signal path connected to a throw of the multi pole multi throw switch.

In one example wherein the second ultra-high band signal path may be an n79 signal path.

In one example the diversity receiver module may further comprise a second n77 signal path.

In one example the diversity receiver module may further comprise a second n79 signal path.

In one example the n77 and n79 signal paths may be connected to a low noise amplifier via a switch.

In one example the second n77 and n79 signal paths may be connected to a second low noise amplifier via a second switch.

In one example the ultra-high band filter may be tunable to support n77 or n79 signals.

In one example the ultra-high band filter may be tunable to support high band transmit signals.

In one example the ultra-high band filter may be configured to be bypassed to support high band transmit signals.

In one example the diversity receiver module may further comprise a single pole three throw switch.

In one example the high band filter may be switch-plexed with the ultra-high band filter via the single pole three throw switch.

In one example the high band filter may be a B41 filter.
In one example the high band filter may be a B40 filter.
In one example the high band filter may be a B7 filter.
In one example the diversity receiver module may further comprise two further high-band filters.

In one example the single pole three throw switch may be used to switch-plex one of the three high-band filters with the ultra-high band filter.

According to another example there is provided, a mobile device, the mobile device comprising: a diversity receiver module including a multiple pole multiple throw switch, one throw being connected to a signal path configured to support both ultra-high band transmit signals and high-band transmit signals, and another throw being connected to an ultra-high band signal path configured to output an ultra-high band receive signal, an ultra-high band filter configured to filter ultra-high band signals, the ultra-high band filter being connected to a pole of the switch via a signal path, a high band filter configured to filter high band receive signals, the high band filter being diplexed with the ultra-high band filter, and a high band signal path configured to output a high-band receive signal, the high band signal path being connected to the high band filter; an antenna configured to support both ultra-high band signals and high band signals; and a high band satellite power amplifier configured to output ultra-high band and high band transmit signals. In one example the antenna may be connected to the diplexed high band filter and ultra-high band filter via a signal path.

In one example the mobile device may further comprise a second antenna configured to support both ultra-high band signals and high band signals.

In one example the diversity module may include a second diplexed ultra-high band filter and high band filter.

In one example the second antenna may be connected to the second diplexed high band filter and ultra-high band filter via a signal path.

In one example the satellite power amplifier may be an n41 power amplifier.

In one example the ultra-high band transmit signal output by the power amplifier may be a sounding reference signal.

In one example the power amplifier may interface with the diversity module via a B41 transmit filter.

In one example the power amplifier may interface with the diversity module via a B40 transmit filter.

According to another example there is provided, a method of signal processing in a mobile device, the method comprising: in a first mode, transmitting an ultra-high band transmit signal from a high-band power amplifier along a signal path configured to support both ultra-high band and high band signals to a multi pole multi throw switch, and passing the ultra-high band transmit signal through an ultra-high band filter to an antenna configured to support ultra-high band and high band signals; in a second mode, transmitting a high-band transmit signal from the high band power amplifier along the signal path configured to support both ultra-high band and high band signals, and tuning the ultra-high band filter such that the high-band transmit signal reaches the antenna configured to support ultra-high band and high band signals; and in a third mode, transmitting an ultra-high band receive signal from the antenna through the ultra-high band filter, routing the ultra-high band receive signal through the switch to an ultra-high band signal path configured to support ultra-high band receive signals, transmitting a high-band receive signal from the antenna through a high-band filter, the high band filter being diplexed with the ultra-high band filter and being connected to a signal path configured to support high-band receive signals.

In one example the high band power amplifier may be an n41 power amplifier.

In one example the high-band transmit signal may be an n41 signal.

In one example the ultra-high band transmit signal may be a sounding reference signal.

In one example the method may further comprise bypassing the ultra-high band filter in the second mode such that the high-band transmit signal can reach the antenna.

In one example the method may further comprise diplexing one of a plurality of high band filters with the ultra-high band filter.

In one example a switch may be used to switch-plex one of the plurality of high band filters with the ultra-high band filter.

In one example there may be three high-band filters.

According to another example there is provided, a mobile device, the mobile device being operable in three modes: in a first mode, an ultra-high band transmit signal from a high-band power amplifier is transmitted along a signal path configured to support both ultra-high band and high band signals to a multi pole multi throw switch, and the ultra-high band transmit signal is passed through an ultra-high band filter to an antenna configured to support ultra-high band and high band signals; in a second mode, a high-band transmit signal from the high band power amplifier is transmitted along the signal path configured to support both ultra-high band and high band signals, and the ultra-high band filter is configured to be tunable such that the high-band transmit signal reaches the antenna configured to support ultra-high band and high band signals; and in a third mode, an ultra-high band receive signal from the antenna is transmitted through the ultra-high band filter, the ultra-high band receive signal is routed through the switch to an ultra-high band signal path configured to support ultra-high band receive signals, a high-band receive signal from the antenna is transmitted through a high-band filter, the high band filter being diplexed with the ultra-high band filter and being connected to a signal path configured to support high-band receive signals.

In one example the signal path may be configured to support both ultra-high band and high band signals is connected to a high power throw of the switch.

In one example ultra-high band signals may have a frequency greater than 3 GHz.

In one example high band signals may have a frequency greater than 2.3 GHz.

In one example high band signals may have a frequency less than 3 GHz.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Aspects and examples described herein are directed to a system architecture for a system architecture with improved performance and a lower component count.

Figure 1:
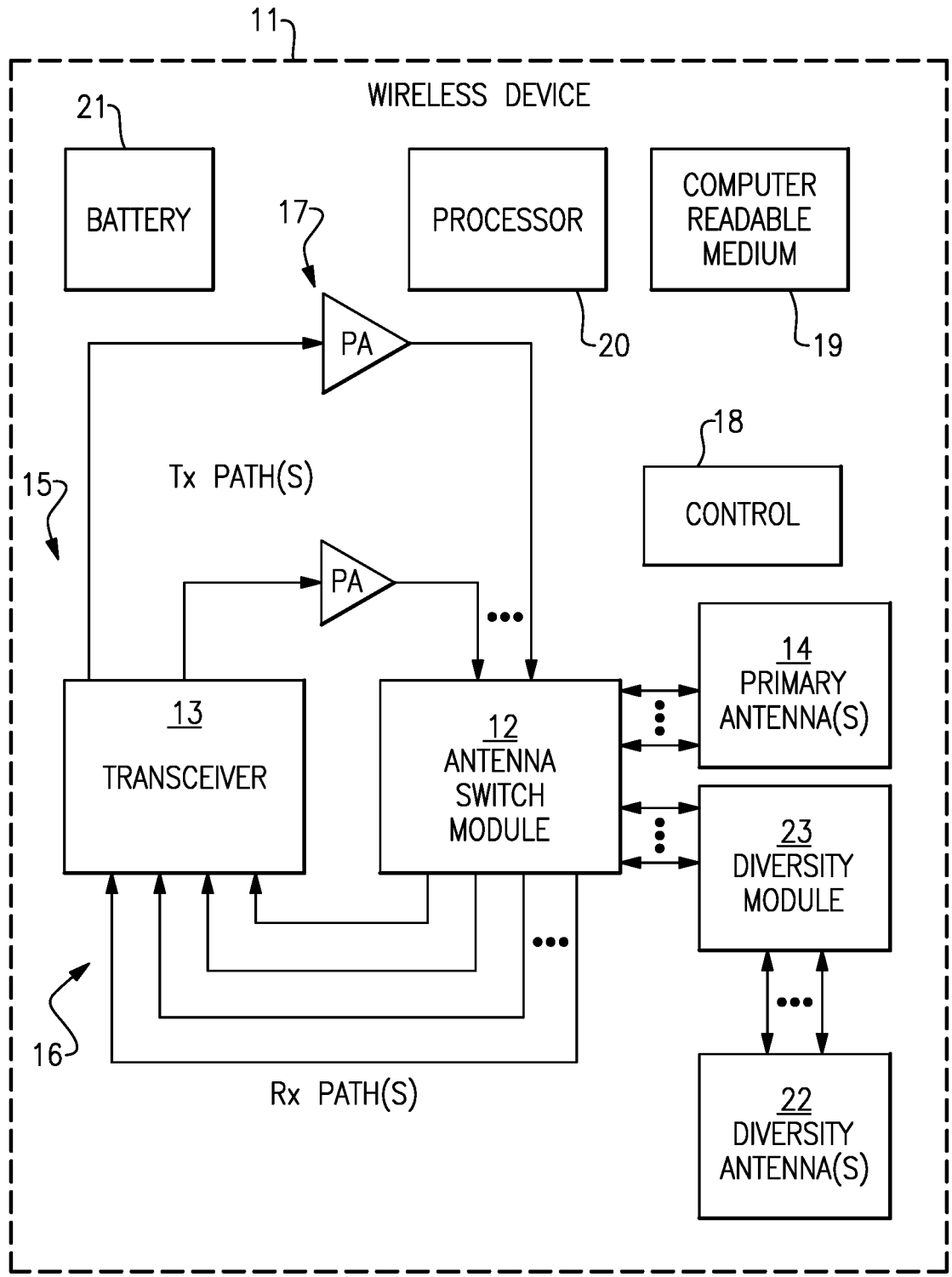
FIG. 1 is a schematic block diagram of an example wireless device.

FIG. 1 is a schematic block diagram of one example of a wireless or mobile device 11. The mobile device 11 can include radio-frequency (RF) modules implementing one or more features of the present disclosure.

The example mobile device 11 depicted in FIG. 1 can represent a multi-band and/or multi-mode device such as a multi-band/multi-mode mobile phone. By way of example, Global System for Mobile (GSM) communication standard is a mode of digital cellular communication that is utilized in many parts of the world. GSM mode mobile phones can operate at one or more of four frequency bands: 850 MHz (approximately 824-849 MHz for Tx, 869-894 MHz for Rx), 900 MHz (approximately 880-915 MHz for Tx, 925-960 MHz for Rx), 1800 MHz (approximately 1710-1785 MHz for Tx, 1805-1880 MHz for Rx), and 1900 MHz (approximately 1850-1910 MHz for Tx, 1930-1990 MHz for Rx). Variations and/or regional/national implementations of the GSM bands are also utilized in different parts of the world.

Code division multiple access (CDMA) is another standard that can be implemented in mobile phone devices. In certain implementations, CDMA devices can operate in one or more of the 800 MHz, 900 MHz, 1800 MHz and 1900 MHz bands, while certain W-CDMA and Long Term Evolution (LTE) devices can operate over, for example, 22 or more radio-frequency-spectrum bands.

RF modules of the present disclosure can be used within a mobile device implementing the foregoing example modes and/or bands, and in other communication standards. For example, 3G, 4G, LTE, Advanced LTE, 5G, and NR are non-limiting examples of such standards.

In the example of FIG. 1, the mobile device 11 includes an antenna switch module 12, a transceiver 13, one or more primary antennas 14, power amplifiers 17, a control component 18, a computer-readable medium 19, a processor 20, a battery 21, one or more diversity antennas 22, and a diversity module 23.

The transceiver 13 can generate RF signals for transmission via the primary antenna(s) 14 and/or the diversity antenna(s) 22. Furthermore, the transceiver 13 can receive incoming RF signals from the primary antenna(s) 14 and/or the diversity antenna(s) 22. It will be understood that various functionalities associated with transmitting and receiving of RF signals can be achieved by one or more components that are collectively represented in FIG. 1 as the transceiver 13. For example, a single component can be configured to provide both transmitting and receiving functionalities. In another example, transmitting and receiving functionalities can be provided by separate components.

In FIG. 1, one or more output signals from the transceiver 13 are depicted as being provided to the antenna switch module 12 via one or more transmission paths 15. In the example shown, different transmission paths 15 can represent output paths associated with different bands and/or different power outputs. For instance, the two different paths shown can represent paths associated with different power outputs (for example, low-power output and high-power output), and/or paths associated with different bands. The transmit paths 15 can include one or more power amplifiers 17 to aid in boosting an RF signal having a relatively low power to a higher power suitable for transmission. Although FIG. 1 illustrates a configuration using two transmission paths 15, the mobile device 11 can be adapted to include more or fewer transmission paths.

In FIG. 1, one or more receive signals are depicted as being provided from the antenna switch module 12 to the transceiver 13 via one or more receiving paths 16. In the example shown, different receiving paths 16 can represent paths associated with different bands. For example, the four example paths 16 shown can represent quad-band capability that some mobile devices are provided with. Although FIG. 1 illustrates a configuration using four receiving paths 16, the mobile device 11 can be adapted to include more or fewer receiving paths.

To facilitate switching between receive and/or transmit paths, the antenna switch module 12 can be used to electrically connect a particular antenna to a selected transmit or receive path. Thus, the antenna switch module 12 can provide a number of switching functionalities associated with operation of the mobile device 11. The antenna switch module 12 can include one or more multi-throw switches configured to provide functionalities associated with, for example, switching between different bands, switching between different power modes, switching between transmission and receiving modes, or some combination thereof. The antenna switch module 12 can also be configured to provide additional functionality, including filtering and/or duplexing of signals.

FIG. 1 illustrates that in certain examples, the control component 18 can be provided for controlling various control functionalities associated with operations of the antenna switch module 12, the diversity module 23, and/or other operating component(s). For example, the control component 18 can provide control signals to the antenna switch module 12 and/or the diversity module 23 to control electrical connectivity to the primary antenna(s) 14 and/or diversity antenna(s) 22, for instance, by setting states of switches.

In certain examples, the processor 20 can be configured to facilitate implementation of various processes on the mobile device 11. The processor 20 can be a general-purpose computer, special-purpose computer, or other programmable data-processing apparatus. In certain implementations, the mobile device 11 can include a computer-readable memory 19, which can include computer-program instructions which may be provided to and executed by the processor 20.

The battery 21 can be any suitable battery for use in the mobile device 11, including, for example, a lithium-ion battery.

The illustrated mobile device 11 includes the diversity antenna(s) 22, which can help improve the quality and reliability of a wireless link relative to a configuration in which a mobile device only includes primary antenna(s). For example, including the diversity antenna(s) 22 can reduce line-of-sight losses and/or mitigate the impacts of phase shifts, time delays, and/or distortions associated with signal interference of the primary antenna(s) 14.

As shown in FIG. 1, the diversity module 23 is electrically coupled to the diversity antenna(s) 22. The diversity module 23 can be used to process signals received and/or signals transmitted using the diversity antenna(s) 22. In certain configurations, the diversity module 23 can be used to provide filtering, amplification, switching, and/or other processing.

Using one or more primary antennas and one or more diversity antennas in a mobile device can improve quality of signal reception. For example, the diversity antenna(s) can provide additional sampling of RF signals in the vicinity of the mobile device. Additionally, a mobile device's transceiver can be implemented to process the signals received by the primary and diversity antennas to obtain a receive signal of higher energy and/or improved fidelity relative to a configuration using only primary antenna(s).

To reduce the correlation between signals received by the primary and diversity antennas and/or to enhance antenna isolation, the primary and diversity antennas can be separated by a relatively large physical distance in the mobile device. For example, the diversity antenna(s) can be positioned near the top of the mobile device and the primary antenna(s) can be positioned near the bottom of the mobile device or vice versa.

The mobile device's transceiver can transmit or receive signals using the primary antenna(s), which the transceiver can communicate with via an antenna switch module. To meet or exceed signal communication specifications, the transceiver, the antenna switch module, and/or the primary antenna(s) can be in relatively close physical proximity to one another in the mobile device. Configuring the mobile device in this manner can provide relatively small signal loss, low noise, and/or high isolation. Additionally, the diversity antenna(s) may be located at a relatively far physical distance from the antenna switch module.

To help send diversity signals received on the diversity antenna(s) to the antenna switch module, the mobile device can include a diversity module for providing amplification, filtering, and/or other processing to the diversity signals. The processed diversity signals can be sent from the diversity module to the antenna switch module via RF signal routes, which can include phone board traces and/or cables.

Mobile devices can operate using a large number of bands which are separated over a wide range of frequency. For example, certain mobile devices can operate using one or more low bands (for example, RF signal bands having a frequency of 1 GHz or less), one or more mid bands (for example, RF signal bands having a frequency between 1 GHz and 2.3 GHz), one or more high bands (for example, RF signal bands having a frequency greater than 2.3 GHz), and one or more ultra-high bands (for example, RF signal bands having a frequency greater than 3 GHz). To aid in communicating over a wide frequency range that includes high, mid, and low bands, certain mobile devices can include multiple primary antennas and/or multiple diversity antennas implemented to provide high performance operation to certain bands. However, other configurations are possible, such as implementations using one primary antenna and/or one diversity antenna. In such configurations, the mobile device can include a diplexer or other suitable circuitry for separating signals associated with different frequency bands.

Figure 2:
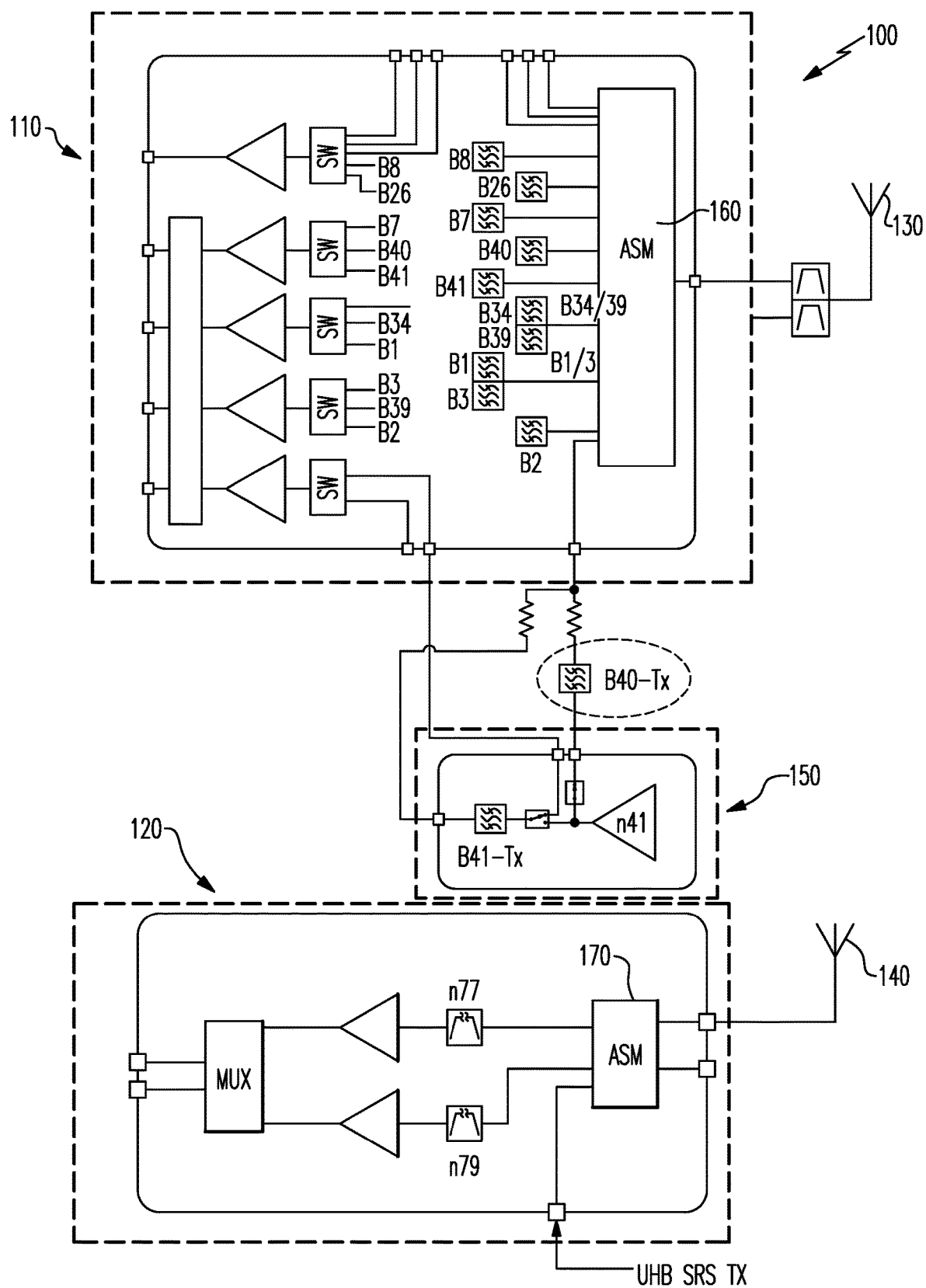
FIG. 2 is a schematic diagram of a radio-frequency system.
Figure 3:
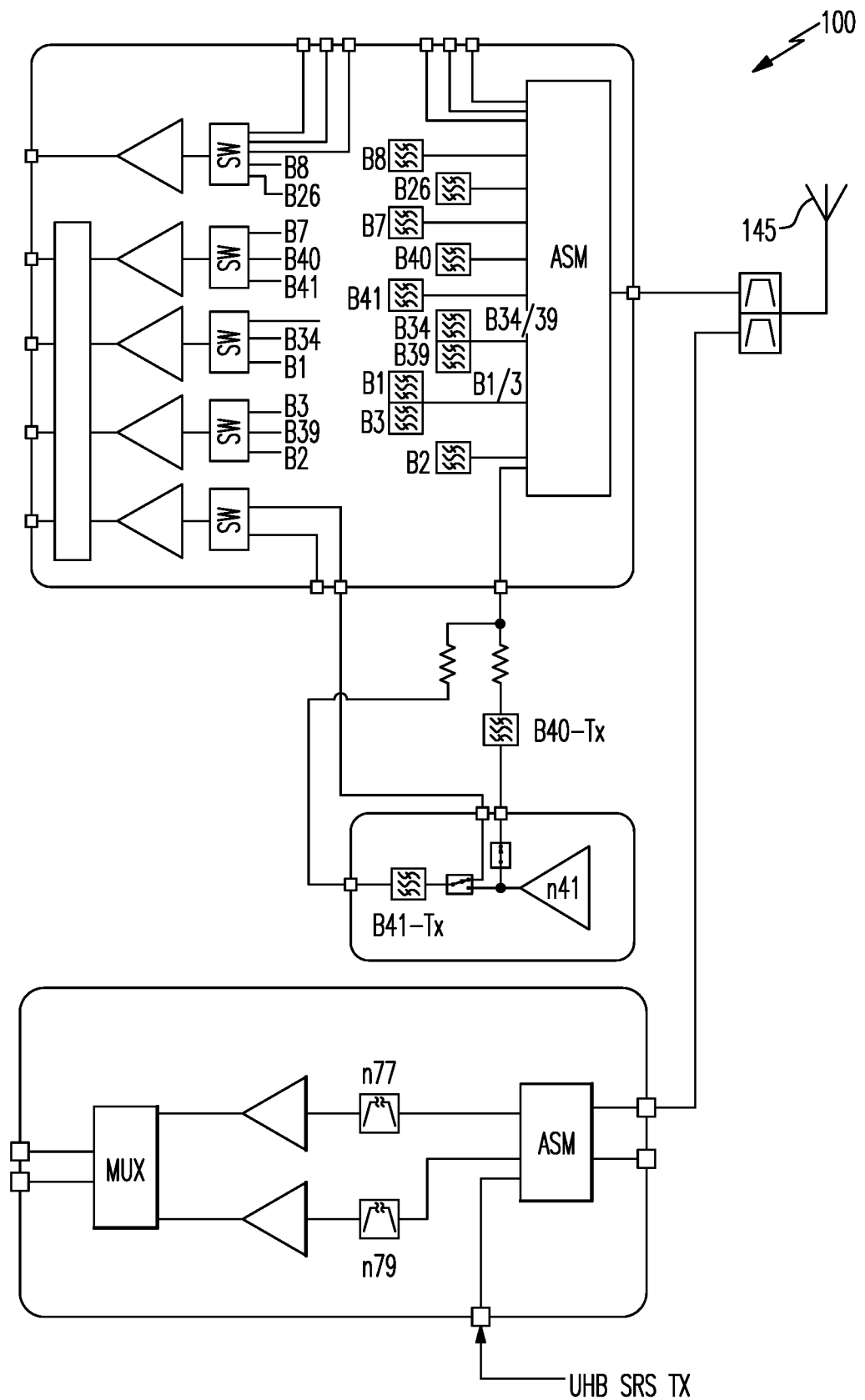
FIG. 3 is a schematic diagram of a second radio-frequency system.

FIG. 2 shows a schematic block diagram of an example RF system 100. The system 100 comprises a range of frequency bands. The frequency bands include low bands (LB), mid-high bands (MHB) and ultra-high bands (UHB). The system 100 comprises a MHB (or low-mid-high band [LMHB] in some examples) diversity receive (DRx) module 110. The system 100 also comprises a UHB DRx module 120. The system 100 further includes a MHB (or LMHB) DRx antenna 130 and a UHB DRx antenna 140. In the example shown, the mid-high bands are separated from the ultra-high bands. Each is supported by a separate module/antenna. In some examples, both MHB and UHB may be supported on the same antenna. An example of such an architecture is shown in FIG. 3. The system 100 in FIG. 3 is similar to that shown in FIG. 2 and like features have been given like reference numerals. However, MHB and UHB are supported on the same antenna 145. It may be difficult to achieve good performance across the whole spectrum and with a DRx module of a reasonable size with the configuration of FIG. 3 when compared to the example shown in FIG. 2. To summarize, in some system architectures such as that shown in FIG. 2 and FIG. 3, DRx content splits MHB (or LMHB) and UHB into separate parts. The MHB (or LMHB) and UHB are usually supported on separate antennas (FIG. 2), or n-plexed onto one antenna (FIG. 3).

Referring still to the example shown in FIG. 2, the RF system 100 further comprises a satellite n41 (NR HB) power amplifier (PA) 150. n41 is the 5G NR (fifth generation New Radio) frequency band. The PA 150 interfaces with the MHB (or LMHB) DRx module 110 by means of a B41-Tx filter. B41 is the LTE frequency band 2496 MHz to 2690 MHz. Band 41 is a popular band in North America, China and Japan. Various carriers between these locations may wish to simultaneously operate B41 and n41. This is an LTE NR ENDC mode in which there are two carriers. One carrier is LTE (B41) and another carrier is 5G NR (n41). Both are in the same band (intraband). ENDC (E-UTRAN New Radio-Dual Connectivity) allows devices to access both LTE and 5G simultaneously. This mode requires two transmitters to be active. To date, two transmitters of this type have not been implemented on the same module due to various associated difficulties. Therefore, in some implementations, such as the example shown in FIG. 2, there is an LTE transmitter from a mid-band PA (not shown) and a separate n41 satellite PA 150 which handles the extra n41 transmitter. The example shown in FIG. 2 also includes support for LTE anchor+n41 ENDC (interband). The LTE anchor is B3. This is the LTE frequency band 1710 MHz-1785 MHz (uplink) and 1805 MHz-1880 MHz (downlink). In summary, support for B41+n41 ENDC and/or LTE anchor+n41 ENDC usually requires a separate satellite n41 (or other HB) PA that interfaces with the MHB (or LMHB) DRx module by means of HB Tx filters.

The MHB DRx module 110 further comprises an antenna switch module (ASM) 160. Depending on the application, four antennas are usually assigned to handle n41 in the overall system. The n41 Tx SRS (sounding reference signal) will need to access these antennas from time to time for signaling with the base station. SRS features can be enabled to determine channel qualities of a communication link between user equipment (for example, a wireless device such as a mobile phone) and a base station. The n41 PA Tx signal is routed to the MHB antenna 130 via ASM 160 as part of the SRS signaling process. In the example shown in FIG. 2, satellite PA 150 comprises an integrated B41-Tx filter. In other systems, the B41-Tx filter may not be integrated and may instead be external. Whether the HB PA integrated B41 filter is used or an external filter is used depends on a number of conditions. One such condition is whether LTE anchor+n41 ENDC requires 4×4 MIMO support on each band. In the example shown in FIG. 2, there is a further unintegrated B40-Tx filter. This may or may not be present in other examples depending on the application and whether support for n40 (HB) is desired. It could, alternatively, be integrated into satellite PA 150.

Routing the n41 Tx signal to MHB antenna 130 interrupts Rx paths for reasons set out below. Communication links in a network can be duplexed in a wide variety of ways, including, for example, using frequency-division duplexing (FDD) and/or time-division duplexing (TDD). FDD is a type of radio-frequency communication that uses different frequencies for transmitting and receiving signals. FDD can provide a number of advantages, such as high data rates and low latency. In contrast, TDD is a type of radio frequency communication that uses about the same frequency for transmitting and receiving signals, and in which transmit and receive communications are switched in time. TDD can provide a number of advantages, such as efficient use of spectrum and variable allocation of throughput between transmit and receive directions. Referring again to the example shown in FIG. 2, B3+n41 ENDC is a very high-demand usage case. This means B3 (LTE anchor), which is an FDD band, will always be on. As it is an FDD band, both Tx and Rx will be on all the time. Although n41 will also always be on, n41 is a TDD band. This means it switches from Tx to Rx constantly. In the context of SRS signaling, when n41 Tx has to send an SRS signal through the path through ASM 160 to antenna 130, the B3 switch arm will also be connected due to the FDD nature of B3. This leads to a number of problems. One such problem is a typical B3 Rx filter cannot handle the power that comes back from the Band 41 Tx signal. The B3 filter, therefore, needs to be a high-power capable filter. This is generally considered expensive to implement. Alternatively, the B3 connection can be disconnected to allow the n41 SRS signal. This interrupts B3 (LTE anchor band) Rx, however, and is considered an undesirable performance hit.

Referring still to the example shown in FIG. 2, MHB DRx module 110 is generally engineered for low powers as it may not be designed to support transmit powers. ASM 160 is, therefore, a low power switch in general. However, support of the n41 Tx signal through the MHB DRX antenna 130 in LTE anchor+n41 ENDC mode, or in B41+n41 ENDC mode, or in n41 SRS mode requires a high-power switch path on ASM 160 at a minimum. High power switches, however, occupy large areas and are expensive.

UHB DRx module 120 further comprises an n77 and an n79 path, and generally operates in NR. The n77 and n79 paths respectively include an n77 and an n79 UHB filter. These are generally bandpass filters, but may be high-pass filters in some implementations. The module 120 further comprises an ASM 170. In the example shown, ASM 170 is integrated. However, in other example configurations the ASM may be external to the UHB DRx module. To support UHB Tx SRS routing to its antenna, ASM 170 comprises a high-power switch path at minimum. This is a similar feature to that discussed above with reference to ASM 160.

Supporting HB_LTE+HB_NR intra-band ENDC, or LTE+HB_NR inter-band ENDC in most system architectures has trouble supporting 4×4 MIMO Rx in each band, or requires the integration of large/costly Tx-capable filters in low-target-cost DRX products. There are other alternatives that are all either costly or undesirable in terms of BOM count and complexity of management. One solution is to integrate high-power Tx filters in DRx modules, by ganging them with DRx CA/DC-band filters. Another method is to disable 4×4 MIMO Rx operation as external HB_NR Tx filters cannot CA-diplex with DRX-integrated LTE filters.

According to some aspects of the present disclosure, an improved system architecture is provided.

Figure 4:
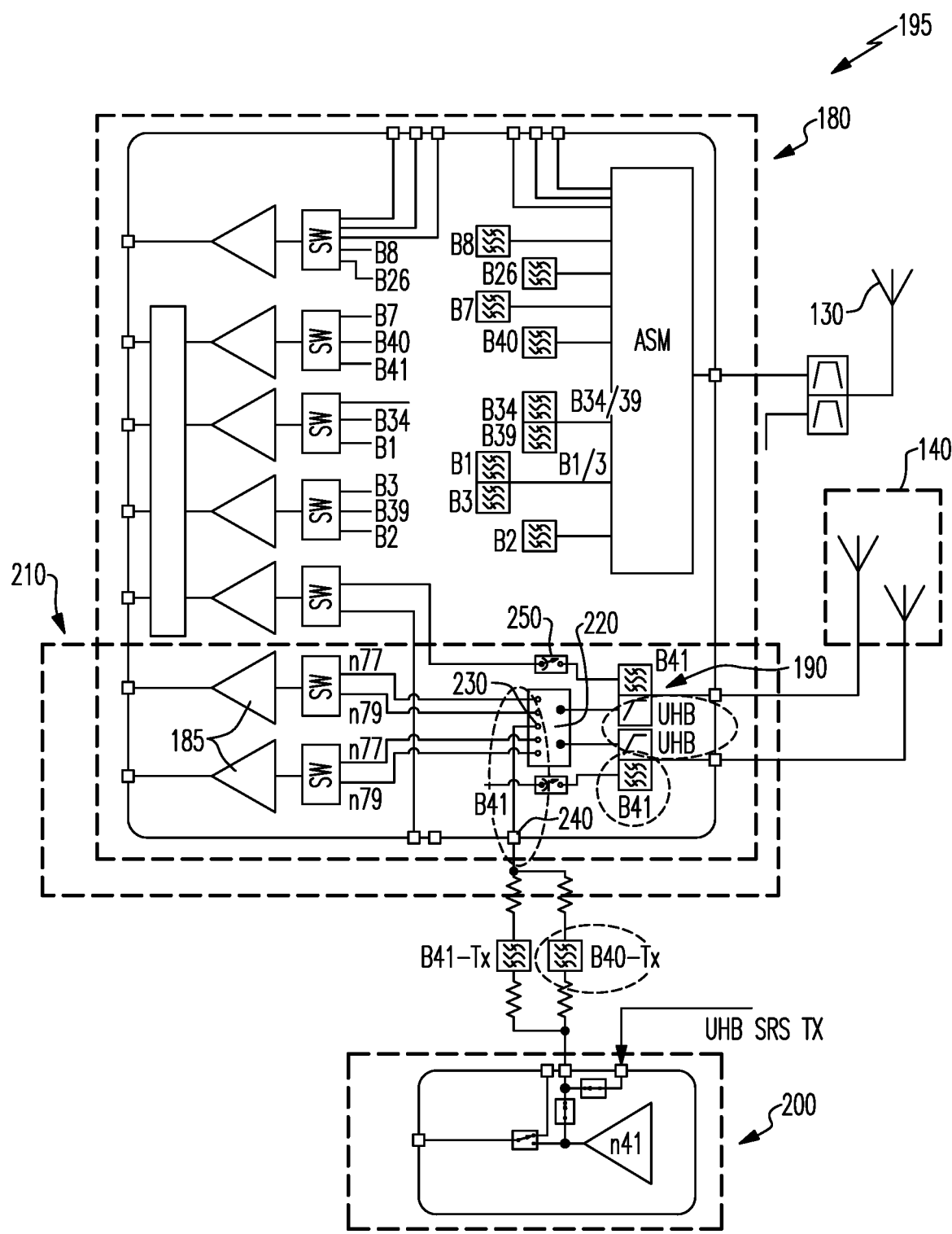
FIG. 4 is a schematic diagram of a radio frequency system according to aspects of the present disclosure.

An example system architecture according to aspects of the present disclosure is shown in FIG. 4. In the example shown, the ultra-high bands and mid-high bands are integrated into the same module 180 in terms of DRx and MIMO paths. The module 180 comprises two n77 and two n79 diversity paths (UHB) and diversity mid-band paths. n77 is the 5G NR frequency band 3300 MHz-4200 MHz. n79 is the 5G NR frequency band 4400 MHz-5000 MHz. In the example shown, the module further comprises UHB antennas 140 and MB antenna 130. The mid-bands are supported by antenna 130 and the ultra-high bands are supported by antenna 140. In other words, the mid-bands and ultra-high bands are supported by separate antennas. However, in some implementations it is possible to support the mid-bands and ultra-high bands on the same antenna. To summarize, the DRx module may integrate MHB (or LMHB in other examples) and UHB into one part. They may be connected to separate antennas or n-plexed onto the same antenna.

In the example shown, the module 180 further comprises two UHB high pass filters (HPF). Each HPF covers both ultra-high bands (77 and 79) and broadband low-noise amplifiers (LNA) 185. The LNAs 185 cover either frequency (n77 and n79) and are each connected to a n79 and n77 signal path via a switch. This arrangement allows 2× UHB MIMO paths to be integrated into the module 180.

Referring still to FIG. 4, module 180 further comprises a diplexed element 190 (also referred to herein as a diplexer). The diplexer 190 includes an UHB filter and a B41 (HB) filter such that it is a diplexer between B41 and UHB. This is done as B41 is an important band that often needs to operate together with UHB. As a result of the diplexed element 190, B41 and UHB are served by the same antenna 140. In other words, HB is diplexed with the UHB filter and served by the same antenna 140.

RF system 195 of FIG. 4 further comprises an n41 satellite PA 200. In the example shown, UHB antenna 140 is further configured to support n41 signaling. As discussed above, there is an anchor band interruption problem associated with supporting LTE anchor+n41 ENDC (or in some cases LTE anchor+n40 ENDC). In RF system 195, however, n41 signaling is separated from the MHB antenna 130 such that the anchor is not interrupted. In other words, separation of the HB from the MB antenna is useful in supporting LTE anchor+n41/n40 ENDC with 4×4 MIMO on both bands without impact to the anchor Rx during NR Tx transmissions.

As discussed above, module 180 includes what is referred to herein as a UHB section 210. UHB section 210 comprises two n77 paths, two n79 paths, two antenna paths and a switch 220. To handle UHB SRS Tx, the switch 220 (which would otherwise be a DP4T switch) includes a further high-power throw 230. The n41 satellite PA 200 is superimposed on the path followed by the UHB SRS Tx signal. As a result, both n41 SRS signals and UHB SRS Tx signals reuse the high-power switch throw (which may be large and expensive) 230, pin 240, and the connection between them. Reusing elements in this way reduces implementation costs. It is important to note that feeding the UHB SRS Tx signal into a common pin as the HB Tx relies in this example on the HB satellite PA definition accommodating this feature. Otherwise, an external SPDT (single-pole double-throw) switch may be necessary.

Referring still to FIG. 4 and considering a UHB SRS signal routed through switch 230 and diplexed element 190, the UHB signal is able to pass through the UHB filter of the diplexed element 190 and reach antenna 140. As discussed above, the path for the UHB SRS signal is reused for n41 SRS signaling. It, therefore, needs to be possible for an n41 SRS signal to be transmitted to UHB antenna 140. Band 41 ends at roughly 2.7 GHz and UHB begins at roughly 3.3 GHz. The 3.3 GHz corner of the UHB filter is tunable, such that it can tuned to handle both n77 (3.3 GHz) or n79 (4.4 GHz). It is also possible to entirely bypass the 3.3 GHz corner entirely to let the Band 41 signal pass through to the UHB antenna in SRS Tx mode, such that it acts similar to an all-pass filter or a high-pass filter with a very low corner.

The B41 Rx filter of diplexed element 190 is necessary to handle the B41 Rx signal. It may be inefficient to have B41 Tx support on UHB antenna 140 and not B41 Rx support. It is important to note that the B41 filter is not a wasted or duplicated filter as it now only appears in the UHB section 210 of module 180 (in comparison to the implementation shown in FIG. 2, for example, in which the B41 filter is located in MHB diversity module 110). The B41 Rx path includes an inline switch 250 which can be opened to prevent the n41 Tx signal from travelling along the Rx path, although this leads to manageable loading loss hit. It is further worth noting that the UHB section 210 of module 180 comprises two diplexed elements 190 and, therefore, two B41 Rx filters. This is because there are always four B41s in the overall system, with two being addressed on the diversity side. In the example of FIG. 4 both of these filters are integrated in the DRx module. This is in comparison to the example shown in FIG. 2, in which there is one integrated B41 Rx filter in MHB module 110 and one external (not shown).

To reiterate the above in other words, in the example shown in FIG. 4, B41 Rx filters are diplexed (or ganged) with UHB filters to support Rx mode in either band (n77 or n79) or in the B41+UHB ENDC case. During UHB NR Tx SRS, the UHB filter is in its default state. During HB LTE/NR (SRS) Tx, the UHB filter may either be bypassed (by switch connection around it, for example) or the HPF corner may be tuned to a much lower frequency (or the corner may even be eliminated). The latter could be accomplished using shunt switches alone if the HPF is designed suitably.

Figure 5:
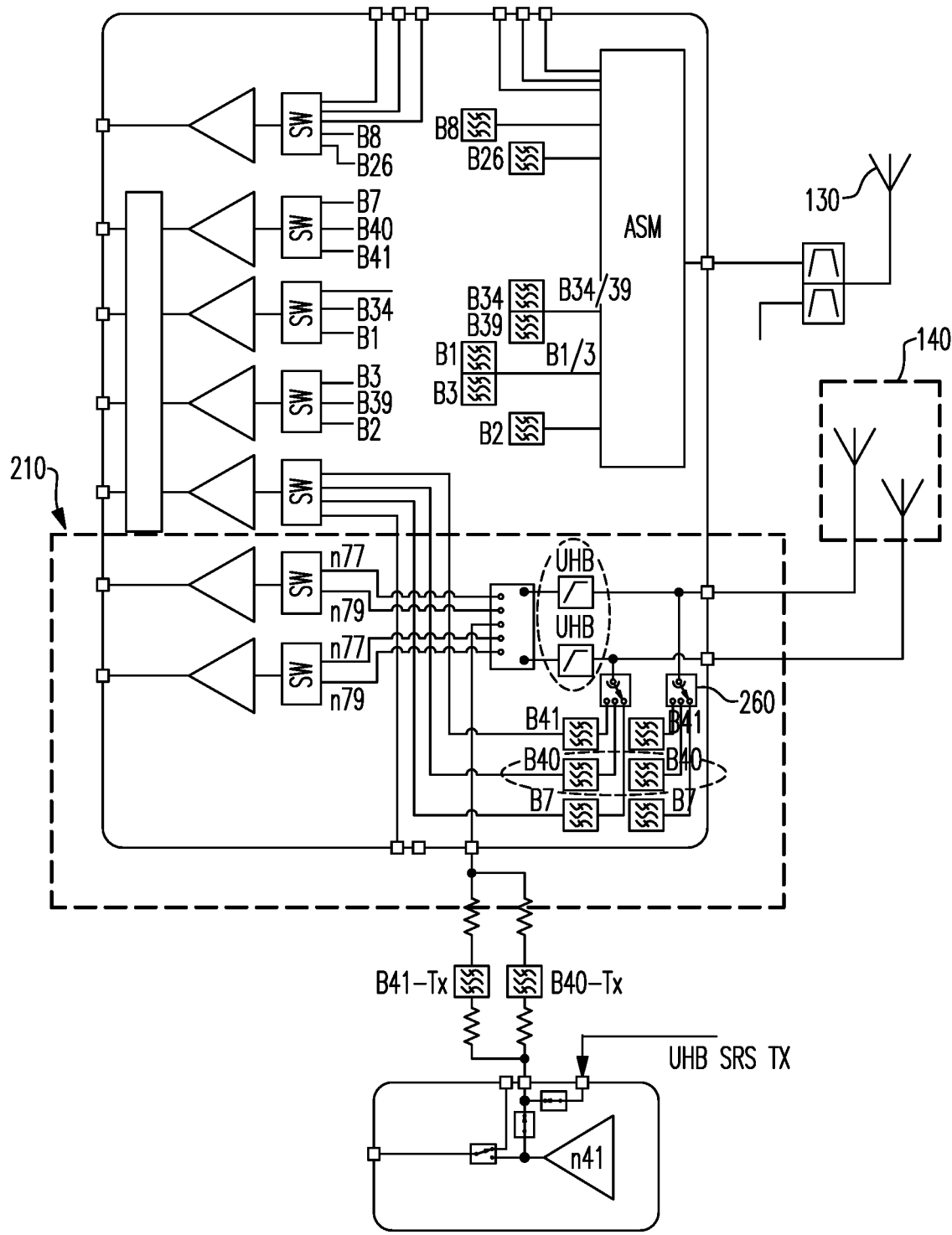
FIG. 5 is a schematic diagram of a second radio frequency system according to aspects of the present disclosure.

It is important to note that diplexing B41 Rx filters with UHB filters is only useful if only wanting to support n41. Another implementation may be desirable if wanting to support n40 or other high-bands in NR mode. It is possible to simply gang/diplex a B40 filter with the UHB filter. However, a logical extension of the system architecture of FIG. 4 is if B41 is to be supported by the UHB antenna, the UHB antenna must be fairly capable of supporting other high band frequencies. It would, therefore, be logical to entirely separate the high bands from the mid bands and further support B40 and B7 on the UHB antenna. Such an implementation is shown in FIG. 5. The system shown in FIG. 5 shares similarities with that shown in FIG. 4, and like features have been given like numerals. In the example shown, the UHB section 210 of module 180 includes two B7 and two B40 filters, in addition to two B41 filters and two UHB filters.

Extending the above discussion, in the interest of efficiency, it is necessary to support B40, B41, and B7 Rx paths in UHB section 210. It is also desirable to diplex either of these bands with UHB, as B41+n78, B40+n79, B40+n77 and B7+n78 are all carrier-aggregation combinations that are expected in the market, each being a combination between high and ultra-high bands. UHB section 210, therefore, further comprises two shunt switches 260 configured to switch in either the B41, B40, or B7 filters to switch-plex with the UHB filter. In other words, B41, B40, and B7 Rx filters are switch-plexed against the UHB filter, using a shunt switch 260. The result is any of the HB, UHB or HB+UHB_NR ENDC cases can be supported by the UHB antenna pins (2× MIMO)

Similar to the example discussed with reference to FIG. 4, the UHB filter corner can be tuned or bypassed entirely to facilitate routing of n40 SRS Tx, or n41 SRS Tx signals through the UHB filter. During said modes, the switches 260 are disconnected to prevent signals flowing down the Rx paths.

Figure 6:
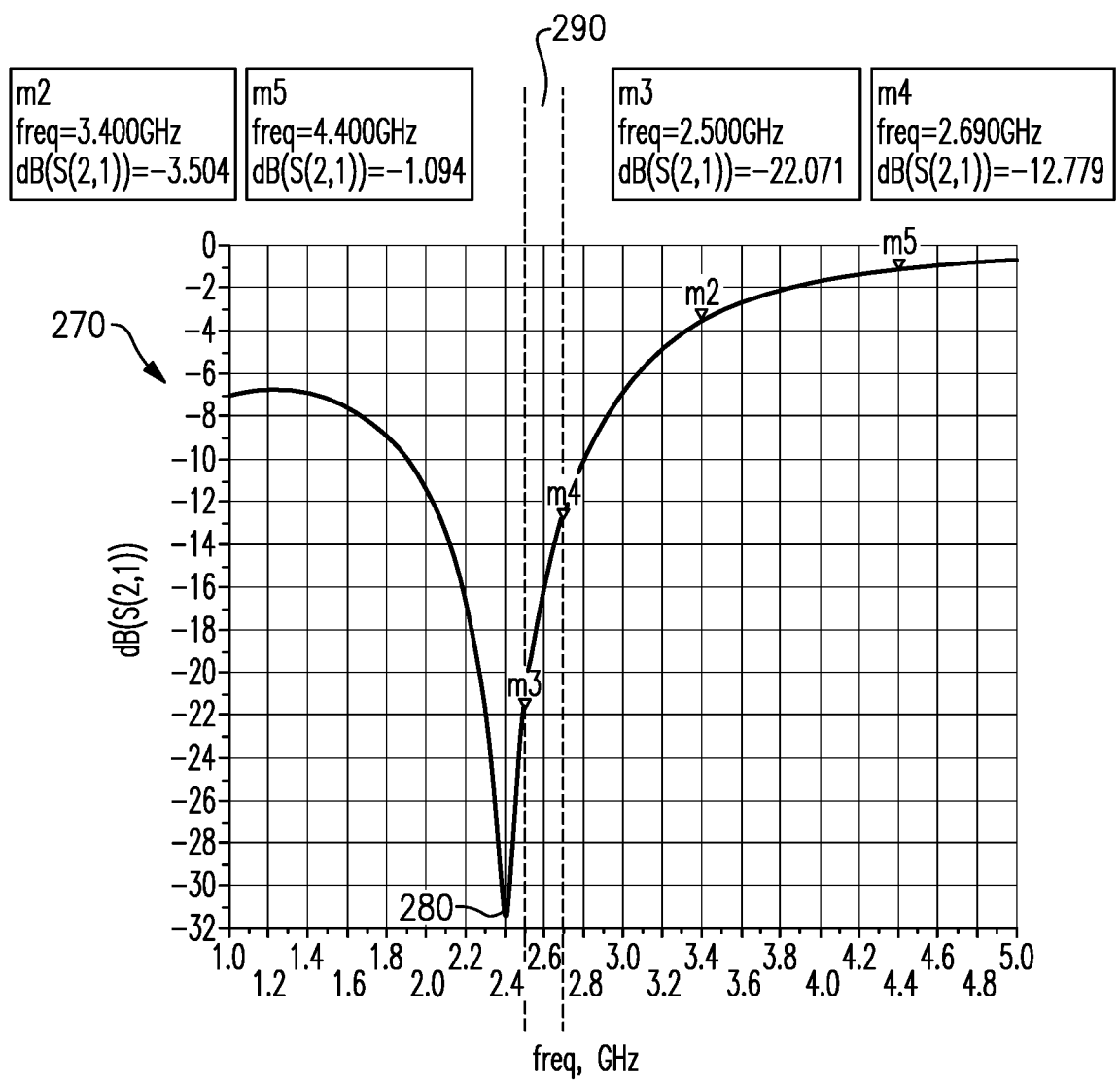
FIG. 6 is a passband of a simulated high pass filter.
Figure 7:
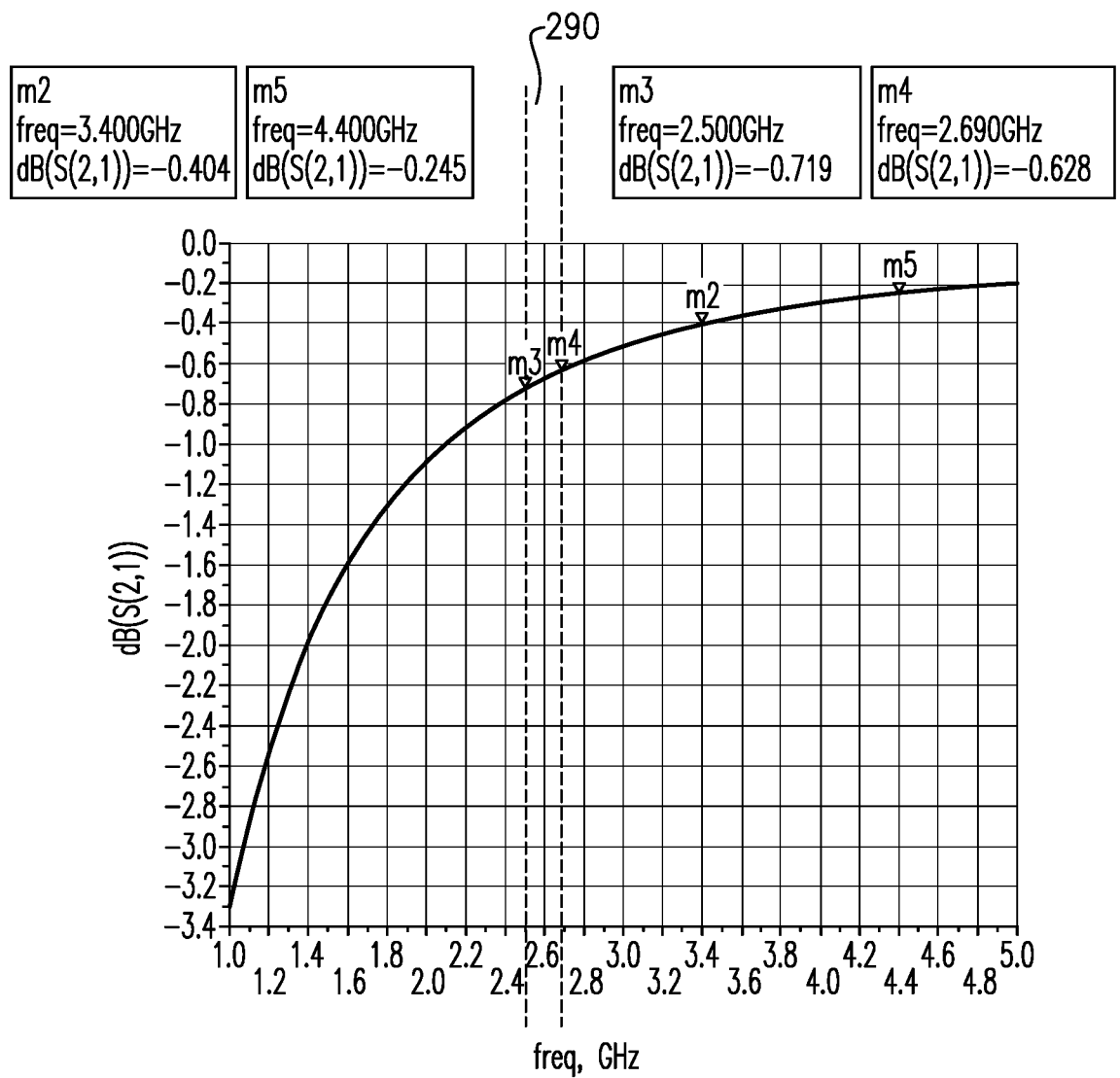
FIG. 7 is a passband of a simulated high pass filter according to aspects of the present disclosure.

FIGS. 6 and 7 show a simulated HPF. In this example, the simulated filter is an n79 HPF. The simulations aim to demonstrate that it is feasible to tune out the corner of the UHB filter of the diplexed element of the examples shown in FIGS. 4 and 5 to allow the UHB path to support the n41 signal. The graph of FIG. 6 shows the filter passband 270. The passband comprises a stopband 280. This stopband is such that n41 signals are prevented from passing through the UHB filter. The n41 frequency range 290 is indicated by the markers m3 and m4. This passband 280 corresponds to the default behavior of an existing UHB filter. FIG. 7 shows the passband 270 when shunt switches have been included in the simulation to tune out the UHB filter corner 280 (not shown in FIG. 7) to the left. The UHB filter now allows n41 signals 290 to pass through.

According to some aspects of the present disclosure, a system architecture is provided with improved performance. By separating the high bands from the mid bands, the above discussed anchor interruption problem is solved that occurs during high band SRS signaling. Furthermore, according to some aspects of the present disclosure, a system architecture is provided with a lower component count. By reusing paths, as discussed above, implementation costs are reduced. Both UHB and HB Tx (whether LTE Tx mode for inter-band ENDC, or LTE Tx for inter-band ENDC, or NR Tx for SRS) can be served by the same two UHB antennas by reusing the same high-power switch and module pin. Other high-power ASM throws (such as on the MHB ASM) are, therefore, eliminated. By reducing component count, what is typically a high-end feature of overcoming the anchor interruption problem can be implemented into lower end products.

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

The invention claimed is:

1. A diversity receiver module, the diversity receiver module comprising:
   a multiple pole multiple throw switch, one throw being connected to a signal path configured to support both ultra-high band transmit signals and high-band transmit signals, and another throw being connected to an ultra-high band signal path configured to output an ultra-high band receive signal;
an ultra-high band filter configured to filter ultra-high band signals, the ultra-high band filter being connected to a pole of the switch via a signal path;
a high band filter configured to filter high band receive signals, the high band filter being diplexed with the ultra-high band filter; and
a high band signal path configured to output a high-band receive signal, the high band signal path being connected to the high band filter.

2. The diversity receiver module of claim 1 wherein the ultra-high band filter is a high-pass filter.

3. The diversity receiver module of claim 1 further comprising a second ultra-high band filter.

4. The diversity receiver module of claim 3 further comprising a second high-band filter.

5. The diversity receiver module of claim 4 wherein the second high-band filter is diplexed with the second ultra-high band filter.

6. The diversity receiver module of claim 4 wherein the second ultra-high band filter is connected to a second pole of the switch.

7. The diversity receiver module of claim 4 wherein the second high-band filter is configured to filter high-band receive signals.

8. The diversity receiver module of claim 4 further comprising a second high-band signal path connected to the second high-band filter.

9. The diversity receiver module of claim 1 wherein the high-band signal path includes an inline switch.

10. The diversity receiver module of claim 1 wherein the ultra-high band filter is tunable to support high-band transmit signals.

11. A method of signal processing in a mobile device, the method comprising:
in a first mode, transmitting an ultra-high band transmit signal from a high-band power amplifier along a signal path configured to support both ultra-high band and high band signals to a multi pole multi throw switch, and passing the ultra-high band transmit signal through an ultra-high band filter to an antenna configured to support ultra-high band and high band signals;
in a second mode, transmitting a high-band transmit signal from the high band power amplifier along the signal path configured to support both ultra-high band and high band signals, and tuning the ultra-high band filter such that the high-band transmit signal reaches the antenna configured to support ultra-high band and high band signals; and
in a third mode, transmitting an ultra-high band receive signal from the antenna through the ultra-high band filter, routing the ultra-high band receive signal through the switch to an ultra-high band signal path configured to support ultra-high band receive signals, transmitting a high-band receive signal from the antenna through a high-band filter, the high band filter being diplexed with the ultra-high band filter and being connected to a signal path configured to support high-band receive signals.

12. The method of claim 11 wherein the ultra-high band transmit signal is a sounding reference signal.

13. The method of claim 11 further comprising bypassing the ultra-high band filter in the second mode such that the high-band transmit signal can reach the antenna.

14. The method of claim 11 further comprising diplexing one of a plurality of high band filters with the ultra-high band filter.

15. The method of claim 14 wherein a switch is used to switch-plex one of the plurality of high band filters with the ultra-high band filter.

16. A mobile device comprising:
a diversity receiver module including a multiple pole multiple throw switch, one throw being connected to a signal path configured to support both ultra-high band transmit signals and high-band transmit signals, and another throw being connected to an ultra-high band signal path configured to output an ultra-high band receive signal, an ultra-high band filter configured to filter ultra-high band signals, the ultra-high band filter being connected to a pole of the switch via a signal path, a high band filter configured to filter high band receive signals, the high band filter being diplexed with the ultra-high band filter, and a high band signal path configured to output a high-band receive signal, the high band signal path being connected to the high band filter;
an antenna configured to support both ultra-high band signals and high band signals; and
a high band satellite power amplifier configured to output ultra-high band and high band transmit signals.

17. The mobile device of claim 16 wherein the antenna is connected to the diplexed high band filter and ultra-high band filter via a signal path.

18. The mobile device of claim 16 further comprising a second antenna configured to support both ultra-high band signals and high band signals.

19. The mobile device of claim 18 wherein the diversity module includes a second diplexed ultra-high band filter and high band filter.

20. The mobile device of claim 19 wherein the second antenna is connected to the second diplexed high band filter and ultra-high band filter via a signal path.

* * * * *